United States Patent [19]

Reiland

[11] 4,129,067

[45] Dec. 12, 1978

[54] BACON COOKING APPARATUS

[76] Inventor: Peter M. Reiland, 27 Eighth Ave., Milford, Conn. 06460

[21] Appl. No.: 859,005

[22] Filed: Dec. 9, 1977

Related U.S. Application Data

[63] Continuation of Ser. No. 727,228, Sep. 27, 1977, abandoned.

[51] Int. Cl.² ............................................. A47J 37/08
[52] U.S. Cl. ........................................ 99/391; 99/339; 99/400; 99/402; 99/450
[58] Field of Search ................. 99/349, 389, 391, 392, 99/393, 339, 400, 402, 426, 427, 385, 449, 450

[56] References Cited

U.S. PATENT DOCUMENTS

| | | | |
|---|---|---|---|
| 1,699,221 | 1/1929 | Carter | 99/391 |
| 1,733,137 | 10/1929 | Spang | 99/402 |
| 2,089,315 | 8/1937 | Wheeler | 99/385 |
| 2,962,957 | 12/1960 | Bork | 99/402 |
| 3,056,344 | 10/1962 | Miller | 99/402 |
| 3,466,998 | 9/1969 | Musgrove | 99/349 |
| 3,511,170 | 5/1970 | O'Connor | 99/402 |
| 3,593,648 | 7/1971 | Walters | 99/402 |

Primary Examiner—Billy J. Wilhite
Attorney, Agent, or Firm—DeLio and Montgomery

[57] ABSTRACT

Apparatus for supporting strips of bacon to be cooked in a conventional toaster including wire mesh means to support the strips on each face thereof and a grease trap along the lower edge of the support means to catch grease cooking out of the bacon. The wire mesh permits the bacon to be heated by the toaster's heating elements directly while causing the grease to drain into the grease trap and preventing it from splattering.

9 Claims, 6 Drawing Figures

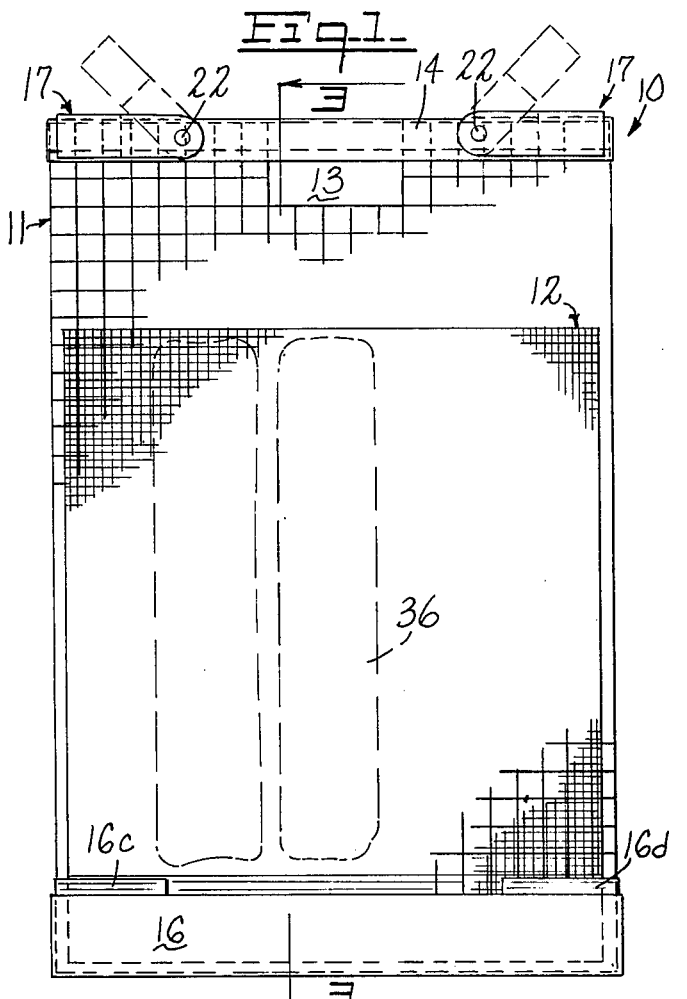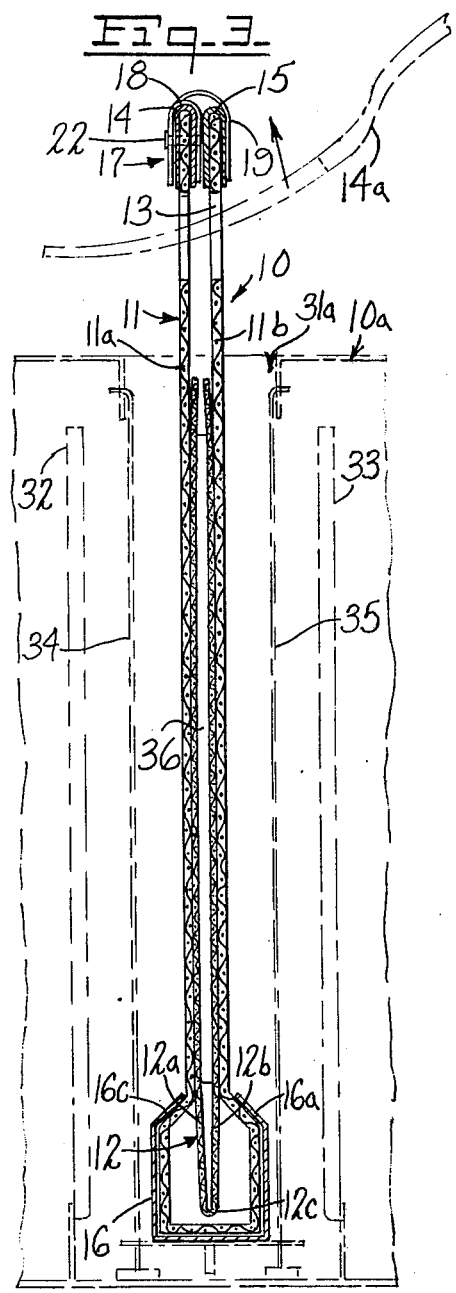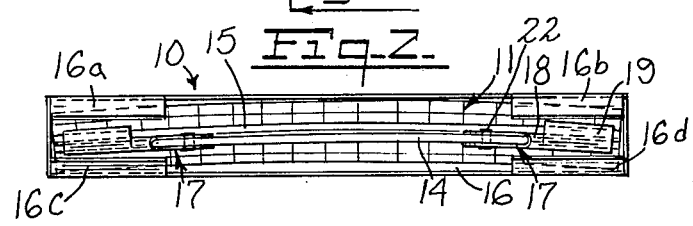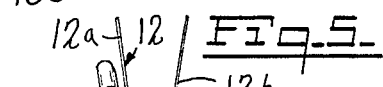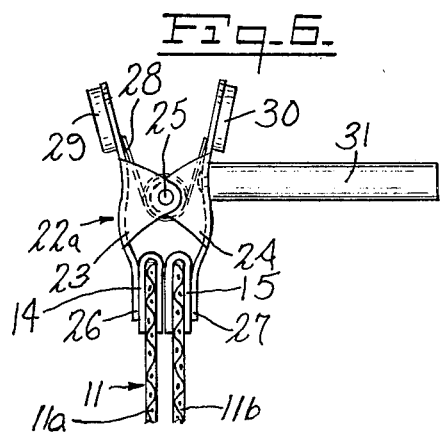

BACON COOKING APPARATUS

This is a continuation of application Ser. No. 727,228, filed September 27, 1977, now abandoned.

This invention relates generally to the field of cooking devices and more specifically to apparatus for cooking bacon.

Heretofore, frying strips of bacon has been one of the messiest of all kitchen chores. While cooking the bacon, grease often splatters onto the stove top and counter and also onto persons in the vicinity of the frying bacon, the former of which must be cleaned up after preparation of the meal, and the second potentially causing severe burns or damage to the eyes and, at a minimum causing some discomfort. Furthermore, as is now the case, bacon is usually fried in a frying pan, the heat being applied directly to only one side of the bacon at a time. In this manner, much energy is wasted, escaping through the frying pan into the air and unduly heating the kitchen. Apparatus is known in the art for covering the frying pan while the bacon is being cooked. An example is a glass plate having a handle adapted to be inserted into the frying pan and to overlie the frying bacon. With such a device, however, the bacon often comes out more well done on one side than on the other and also comes out greasy because the bacon is held in the grease that normally cooks out of the bacon.

It is therefore an object of this invention to provide a new and improved apparatus to assist in uniformly and efficiently cooking strips of bacon with a minimum of mess and inconvenience.

It is another object of the invention to provide an apparatus to hold strips of bacon so they may be cooked on both sides simultaneously.

It is yet another object to provide apparatus that allows grease to drain from the bacon while it is cooking, providing substantially less greasy cooked bacon.

It is another object to provide a new and improved bacon-cooking apparatus that suppresses grease splatter from the cooking bacon.

Briefly stated, the invention provides apparatus to be used with a conventional toaster for supporting strips of bacon with the flat surfaces thereof vertical in face to face opposition to the heating elements of the toaster. A support, a pair of mesh screens, is provided to support the strip on each face thereof. A grease catcher is provided along the lower edge of the support to catch the grease draining down the supporting apparatus into the grease catcher while the bacon is being cooked. Clasps are provided along the periphery of the supporting screens to secure the bacon strips therebetween tightly. An aperture is provided proximate the upper edge of the support through which a fork or the like may be inserted to remove the apparatus from the toaster when the bacon is cooked. In a modification, the clasp comprises a pinch-clamp having an integral handle.

The features of the invention which are believed to be novel are particularly pointed out and distinctly claimed in the concluding portion of this specification. However, the invention both as to its origin and operation, together with further objects and advantages thereof, may best be appreciated by reference to the following detailed description taken in conjunction with the drawings, in which:

FIG. 1 discloses a front elevational view of a support frame embodying the invention;

FIG. 2 shows a top view of the frame shown in FIG. 1;

FIG. 3 shows a sectional view taken along line 3—3 in FIG. 1;

FIG. 4 shows an isometric view of one embodiment of a clasp useful with the apparatus;

FIG. 5 shows a schematic side view of the inner and outer supports, clamps and grease catcher, and FIG. 6 shows a side view of the modified clamp having an integral handle.

With reference to the drawings, the invention provides a support frame 10 for vertically supporting strips of bacon adapted to be used in conjunction with a conventional toaster 10a for cooking the bacon. The support frame 10 includes a first mesh outer support screen 11, having a left side member 11a and right side member 11b. A second mesh inner support screen 12 is provided having a left side member 12a and right side member 12b, the two side members 12a and 12b being joined along their lower edges 12c. Inner support 12 comprises a screen having a relatively fine mesh. The mesh of inner support 12 is sufficiently coarse to allow heat from the toaster to cook the bacon while catching the grease that cooks out of the bacon and removing the grease by allowing it to drain downwardly away from the bacon strips supported thereby. The coarser mesh of screen 11 is sufficiently sturdy to support the inside mesh 12 in an upright position in the afore-mentioned toaster 10a. An aperture 13 is provided near the upper edge in outer screen 11 to allow a fork 14a (shown in phantom lines in FIG. 3) inserted thereto to remove the frame 10 from the toaster.

A pair of edge strips 14 and 15 are provided along the upper edges of the outer support 11 to maintain support 11 in a bowed configuration as shown in FIG. 2. The edge strips 14 and 15 further keep the mesh of support 11 from unravelling or unduly bending or losing its bowed shape while being handled.

The invention further provides a grease trap 16 at the lower edge of support 11. The mesh screen comprising support 11 extends down into and lines the inside of the trough comprising drain 16, the trough having tabs 16a–d to secure it to vertical support screen 11. The drain 16 is supported and carried by support 11.

With reference to FIG. 4, frame 10 further includes two clasps 17 comprising a pivot portion 18 with a U-shaped cross-section having a narrow separation between the two arms thereof, and a clamp portion 19 having a wider separation between the two arms thereof. Apertures 20 and 21 are provided in the arms of portion 18 to provide pivot points for clasp 17. Clasps 17 are attached to support 11 along one of the upper strips 14 or 15, pivotally supported thereon by rivet 22 extending through apertures 20 and 21. Narrow portion 18 is adapted to fit over one edge strip, whereas wide portion 19 is adapted to fit over both strips and snugly holds them securely therebetween.

With reference to FIG. 6, a second embodiment of the clasp 22a comprises two opposing members 23 and 24 joined at a pivot point 25. Pincer members 26 and 27 at one end of opposing members 23 and 24, respectively, ae adapted to pinch strips 14 and 15 together. A resilient spring member 28 serves to force pincer members 26 and 27 together. Finger pads 29 and 30, preferably of heat insulating and heat resistant material, are provided to allow pincer members 26 and 27 to be pivoted apart, releasing edge strips 14 and 15 and allowing the supports to be opened. A handle 31 is provided attached to modified clasp 22a.

With reference to FIG. 3, the use of the support frame 10 will be described. The invention is particularly useful in connection with a conventional toaster 10a having a plurality of horizontally-disposed slots 31a and further having a heating element 32 and 33 on each side thereof. The toaster further includes wire spacers 34 and 35 uniformly spaced apart from heating elements 32 and 33. The toaster may be of the type that automatically pops the toasted bread therefrom, the bacon being cooked in the time provided thereby.

In use, one or more strips of bacon 36 are positioned between the members 12a and 12b of fine mesh inner screen support 12. Inner support 12 and the bacon strips 36 supported thereby are then inserted between members 11a and 11b of outer support screen 11, the bottom end of screen 12 being inserted far down into the trough comprising drain 16. The bacon strips 36 remain spaced above the bottom of drain 16. Support screen 11 has a slight predetermined bow or curvature, as seen from the top in FIG. 2, to maintain a constant firm pressure on bacon strips 36 to provide a firm support therefor. The edge strips 14 and 15 are secured together either by clasp 17 or by the modified pinch clamp 22a.

The apparatus with the bacon strips supported thereby is then inserted into the slot 31a in the toaster to be cooked thereby. The bacon is thoroughly cooked during the standard toaster cooking cycle (the toaster setting may be adjusted to suit the user's preferred doneness). The grease that cooks from bacon strips 36 is drained into trough 16 by the fine mesh inner support 12. After the bacon is cooked, the toaster popping up indicates that the bacon is done, apparatus 10 may be removed therefrom either by inserting a fork into aperture 13 or by lifting by handle 31 if modified clasp 22a is provided.

The bacon may then be removed by opening the clasps 17 or removing pinch clamp 22a, separating opposing support screens 11a and 11b and inner mesh screens 12a and 12b, thereby exposing the cooked bacon. The drained grease may be removed from drain 16.

Mesh screens 11 and 12 are preferably of stainless steel wire or another suitable material to which the bacon would avoid sticking. The mesh of screen 12 is large enough to allow heat from heating elements 32 and 33 to reach strips 36 substantially unimpeded while it is sufficiently narrow to catch the grease cooking from the bacon and prevent it from splattering.

It may thus be seen that the objects of the invention set forth as well as those made apparent from the foregoing description are efficiently attained. While preferred embodiments of the invention have been set forth for purposes of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Apparatus adapted to removably support a strip of bacon to be cooked in a toaster having spaced heating elements comprising:

means adapted to support said strip in said toaster between said heating elements to be cooked thereby, said support means comprising an inner support means adapted to receive said strip of bacon and to drain the grease away from the bacon, and an outer support means adapted to receive said inner support means;

drain means carried by said support means for receiving the grease drained from the cooking bacon; and handle means facilitating the insertion of said apparatus into the toaster and the removal of said apparatus from the toaster.

2. Apparatus as defined in claim 1 wherein said inner support means comprises a pair of screens having a fine mesh in overlying parallel relationship adapted to receive said strip therebetween.

3. Apparatus as defined in claim 2 in which said outer support means comprises a pair of screens having a coarse mesh in parallel relationship adapted to receive the inner support means therebetween.

4. Apparatus as defined in claim 3 wherein said outer support means is slightly bowed and said inner support means is sufficiently resilient to conform at least partially to the bow.

5. Apparatus as defined in claim 3 wherein said outer support means has an edge adapted to be a lower edge and wherein said drain means comprises a trough situated at said lower edge, said screens comprising said outer support means extending downwardly into said trough.

6. Apparatus as defined in claim 5 wherein said screens comprising said outer support means each have an edge adapted to be an upper edge distal to said trough said upper edges being substantially contiguous to one another.

7. Apparatus as defined in claim 6 further comprising removable clasp means for releasably securing said distal edges together.

8. Apparatus as defined in claim 7 wherein said clasp means comprises a member having a U-shaped cross-section pivotally supported by one of said upper edges and adapted to pivot over and secure both of said upper edges between the arms thereof.

9. Apparatus as defined in claim 7 wherein said clasp means comprises a pinch clamp having a handle secured thereto.

* * * * *